United States Patent
Aso et al.

(10) Patent No.: US 8,119,298 B2
(45) Date of Patent: Feb. 21, 2012

(54) FUEL CELL SYSTEM AND MOBILE BODY

(75) Inventors: Shinji Aso, Toyota (JP); Tomohiro Saito, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 741 days.

(21) Appl. No.: 12/085,169

(22) PCT Filed: Nov. 27, 2006

(86) PCT No.: PCT/JP2006/324119
§ 371 (c)(1),
(2), (4) Date: May 19, 2008

(87) PCT Pub. No.: WO2007/069482
PCT Pub. Date: Jun. 21, 2007

(65) Prior Publication Data
US 2009/0068514 A1    Mar. 12, 2009

(30) Foreign Application Priority Data
Dec. 13, 2005 (JP) .................................. 2005-359439

(51) Int. Cl.
*H01M 8/04* (2006.01)
(52) U.S. Cl. .................................................... 429/432
(58) Field of Classification Search .................. 429/430, 429/431, 900; 320/104, 140; 318/139
See application file for complete search history.

(56) References Cited

U.S. PATENT DOCUMENTS

| 7,049,788 B2 * | 5/2006 | Itou ................................ 320/101 |
| 7,582,370 B2 * | 9/2009 | Goto et al. ..................... 429/424 |
| 2002/0038732 A1 | 4/2002 | Sugiura et al. |

FOREIGN PATENT DOCUMENTS

| JP | 2002-112408 A | 4/2002 |
| JP | 2002-118981 A | 4/2002 |
| JP | 2002-313396 A | 10/2002 |
| JP | 2004-112883 A | 4/2004 |
| JP | 2004-222376 A | 8/2004 |
| JP | 2005-44629 A | 2/2005 |
| JP | 2005-93120 A | 4/2005 |
| JP | 2005-190775 A | 7/2005 |
| JP | 2005-229699 A | 8/2005 |
| JP | 2006-286305 A | 10/2006 |

* cited by examiner

*Primary Examiner* — Ula C Ruddock
*Assistant Examiner* — Thomas H Parsons
(74) *Attorney, Agent, or Firm* — Kenyon & Kenyon LLP

(57) ABSTRACT

A fuel cell system that can continue a stable operation of a fuel cell and perform un-interrupted operation of the system even upon the occurrence of an abnormality in a voltage converter, and a mobile body. A fuel cell system where an accumulator device is connected to a load via a voltage converter in parallel with a fuel cell includes an auxiliary equipment connected nearer the fuel cell than the voltage converter, and a control device for controlling the voltage converter and the auxiliary equipment. The control device changes the operational point of the auxiliary equipment when an abnormality has occurred in the voltage converter.

17 Claims, 2 Drawing Sheets

FUEL CELL SYSTEM AND MOBILE BODY

This is a 371 national phase application of PCT/JP2006/324119 filed 27 Nov. 2006, which claims priority of Japanese Patent Application No. 2005-359439 filed 13 Dec. 2005, the contents of which are incorporated herein by reference.

TECHNICAL FIELD

The present invention relates to a fuel cell system and a mobile body, and relates particularly to a fuel cell system that includes an accumulator device and a fuel cell.

BACKGROUND ART

Conventionally, as described in Japanese Patent Application Laid-Open No. 2002-118981 and No. 2004-222376, a fuel cell system is known wherein a battery is connected in parallel with a fuel cell via a DC-DC converter that serves as a voltage converter.

According to Japanese Patent Application Laid-Open No. 2002-118981, the fuel cell system is mounted in a vehicle. Then, a fuel cell auxiliary equipment is connected between a DC-DC converter and a battery. With this arrangement, when an abnormality occurs in the DC-DC converter, the fuel cell auxiliary equipment continues to be driven by power received from the battery, and un-interrupted operation of the fuel cell is ensured.

DISCLOSURE OF THE INVENTION

However, upon the occurrence of an abnormality in the DC-DC converter, the supply of power to the fuel cell auxiliary equipment depends on the battery. Therefore, in a case wherein the electricity stored in the battery is reduced, to drive the fuel cell auxiliary equipment becomes difficult, and the fuel cell hard to operate.

In addition, in Japanese Patent Application Laid-Open No. 2002-118981, there is no description of a limp-home mode for a traction motor, etc., when the DC-DC converter is halted because of an abnormality. Therefore, either a power supply shortage or excessive power generation may occur.

The objective of the present invention is to provide a fuel cell system that stably operates a fuel cell, even in a case wherein an abnormality has occurred in a voltage converter, and thus enables the uninterrupted operation of the system, and to provide a mobile body.

To achieve the above described objective, a fuel cell system according to the present invention includes a fuel cell; an accumulator device connected to a load through a voltage converter in parallel with the fuel cell; an auxiliary equipment connected nearer the fuel cell than the voltage converter; and a control device for controlling the voltage converter and the auxiliary equipment. Upon the occurrence of an abnormality in the voltage converter, the control device changes an operational point of the auxiliary equipment.

According to this configuration, when an abnormality occurs in the voltage converter, the auxiliary equipment can be driven by supplying electric power from the fuel cell. Furthermore, upon the occurrence of an abnormality in the voltage converter, the operational point of the auxiliary equipment is changed. Therefore, in a case wherein the auxiliary equipment is, for example, associated with the operation of the fuel cell, the operational point should be changed to provide for a stable operation of the fuel cell, so that the operation of the system is continued. Further, even in a case wherein, for example, the auxiliary equipment is not associated with the operation of the fuel cell, the operational point may be changed for performance of a stable operation of the fuel cell, so that operation of the system can be continued.

Preferably, upon the occurrence of an abnormality in the voltage converter, the control device changes the operational point of the auxiliary equipment after the voltage converter is halted.

With this configuration, since the voltage converter is halted, damage to high-voltage parts can be avoided.

Preferably, the auxiliary equipment is an auxiliary equipment that is to be associated with the operation of the fuel cell, and upon the occurrence of an abnormality in the voltage converter, the control device changes the operational point, so that the electric power consumed by the auxiliary equipment is greater than that normally consumed.

With this configuration, the auxiliary equipment can be driven with more sufficient allowance than usual, and the fuel cell can be stably operated.

It is preferable that the auxiliary equipment include at least one of a compressor for feeding an oxidizing gas under pressure to the fuel cell, a pump for circulating a fuel gas to the fuel cell, and a cooling pump for supplying a refrigerant to the fuel cell.

More preferably, upon the occurrence of an abnormality in the voltage converter, the control device increases the number of revolutions of at least one of the compressor, the pump and the cooling pump.

Preferably, the auxiliary equipment includes at least either a purging valve for discharging fuel off-gas from the fuel cell or a passage switching valve for switching between refrigerant passages in order to cool the fuel cell.

More preferably, upon the occurrence of an abnormality in the voltage converter, the control device increases at least either an ON/OFF count for the purging valve or a switching count for the passage switching valve.

Preferably, the auxiliary equipment is an auxiliary equipment for use at a high-voltage.

Preferably, the fuel cell system of this invention includes a second accumulator device connected, via a second voltage converter, to the voltage converter in parallel with the accumulator device; and a second auxiliary equipment connected nearer the second accumulator device than the second voltage converter. Further, the second accumulator device, the second voltage converter and the second auxiliary equipment are those used for a lower voltage than that for the accumulator device, the voltage converter and the auxiliary equipment.

In order to achieve the above described objective, another fuel cell system according to the present invention includes a power generation unit to be driven by receiving electric power; a fuel cell for supplying electric power to the power generation unit; an accumulator device connected to the power generation unit and in parallel with the fuel cell; and a voltage converter located between the fuel cell and the power generation unit, or between the accumulator device and the power generation device. This fuel cell system comprises a control device for controlling the voltage converter and the power generation unit, the control device limits the output of the power generation unit upon the occurrence of an abnormality in the voltage converter.

According to this configuration, upon the occurrence of the abnormality in the voltage converter, the power generation unit can still be driven by power supplied by the fuel cell or the accumulator device. In addition, upon the occurrence of the abnormality in the voltage converter, the output of the power generation unit is limited. Therefore, a shortage in the supply of electric power or excessive generation of electric power can be avoided, and the operation of the system can be continued through the performance of a stable operation by the fuel cell. For example, in a case wherein this fuel cell system is mounted in a mobile body, moving of the mobile body does not need to be halted upon the occurrence of an abnormality in the voltage converter.

Preferably, upon the occurrence of an abnormality in the voltage converter, the control device adjusts an upper limit value for the output of the power generation unit.

As described above, since the upper limit output of the power generation unit is designated relative to the amount of electric power generated by the fuel cell, the system can be operated with sufficient allowance.

More preferably, the control device designates the upper limit value, for the output of the power generation unit, which is smaller than the rated load power for the power generation unit.

Preferably, upon the occurrence of an abnormality in the voltage converter, the control device adjusts a lower limit value for the output of the power generation device.

For example, assume a case wherein the power generation device is a traction motor. Upon the occurrence of an abnormality in the voltage converter, when more power is generated by regeneration of the traction, the generated power is not stored in the accumulator device and has nowhere to go. While taking this situation into account, the lower limit output for the traction motor is designated upon the occurrence of the abnormality of the voltage converter, so that an extra power state can be prevented.

More preferably, the control device designates the lower limit value for the output of the power generation device that is greater than the rated electric power generated by the power generation unit.

Preferably, the fuel cell system includes an auxiliary equipment connected nearer the fuel cell than the voltage converter.

Preferably, upon the occurrence of an abnormality in the voltage converter, the control device changes an operational point of the auxiliary equipment.

A mobile body of the present invention comprises the above described fuel cell system of the invention. This mobile body is an automobile, such as a two-wheel or four-wheel automotive vehicle, or a train, an airplane, a ship or a robot.

Preferably, upon the occurrence of an abnormality in the voltage converter, the control device permits the mobile body to travel in a limp home mode.

BEST MODE FOR CARRYING OUT THE INVENTION

A fuel cell system according to a preferred mode of the present invention will now be described while referring to the accompanying drawings. Here, a description will be given for an example wherein the fuel cell system is mounted in a vehicle as one automotive type of mobile body.

Figure 1:
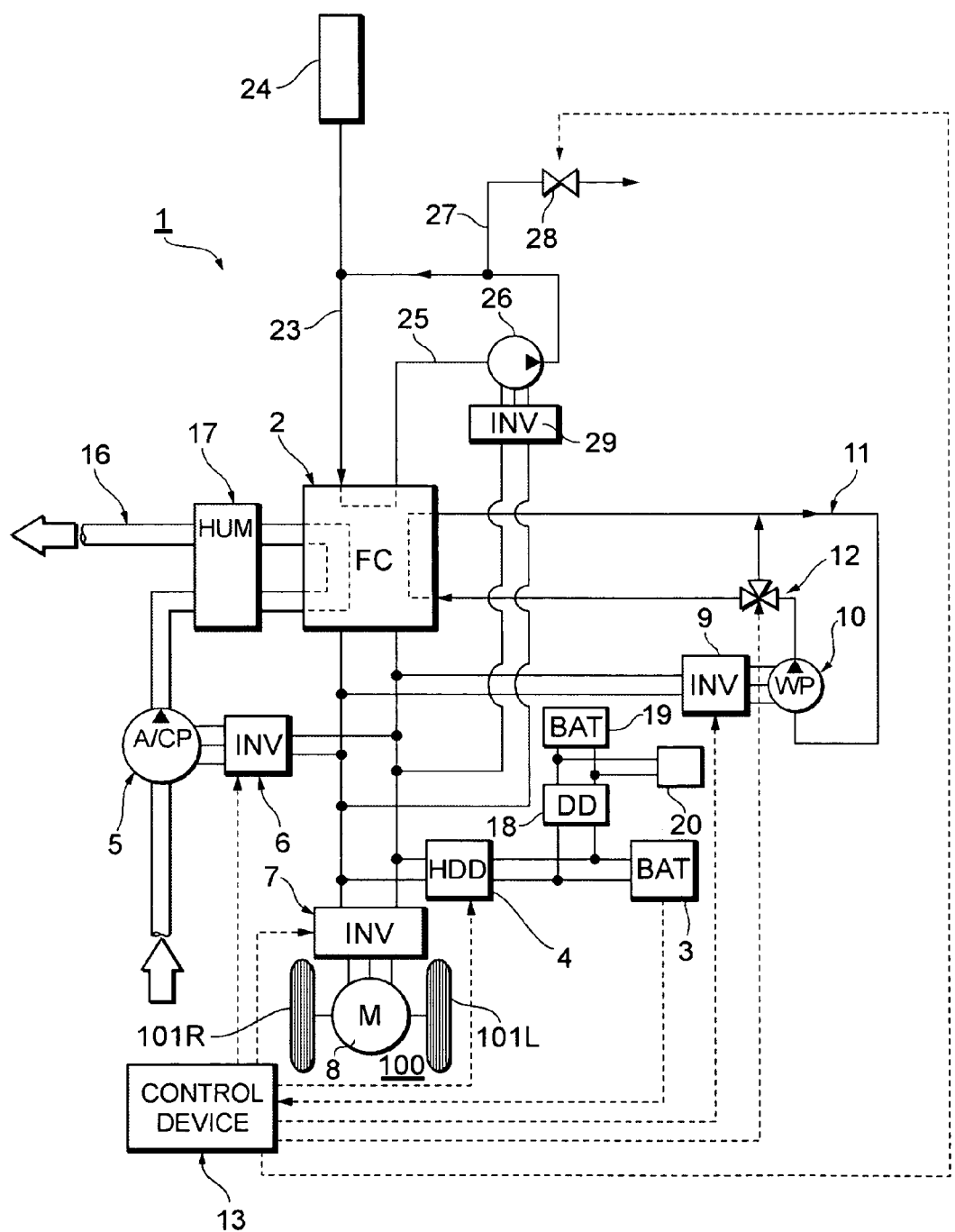
FIG. 1 is a schematic diagram illustrating the configuration of a fuel cell system mounted in a vehicle.

As shown in FIG. 1, a vehicle 100 travels using, as a drive force source, a traction motor 8 (power generation device) that is coupled to wheels 101L and 101R. The power source of the traction motor 8 is a fuel cell system 1. A direct current output by the fuel cell system 1 is converted into a three-phase alternating current by an inverter 7, and the three-phase alternating current is supplied to the traction motor 8. Further, for braking the vehicle 100, the traction motor 8 is driven by the wheels 101L and 101R, and serves as a power generator to perform three-phase AC power generation. The three-phase alternating current is converted into a direct current by the inverter 7, and the direct current is stored in the accumulator device 3.

The fuel cell system 1 includes a fuel cell 2, the accumulator device 3, a high-voltage DC/DC converter 4 and a control device 13. The high-voltage DC/DC converter 4 is located between the accumulator device 3 and the inverter 7. The accumulator device 3 is connected to the traction motor 8, via the high-voltage DC/DC converter 4, in parallel with the fuel cell 2. It should be noted that instead of an arrangement wherein the high-voltage DC/DC converter 4 is located between the accumulator device 3 and the traction motor 8, the high-voltage DC/DC converter 4 may be arranged between the fuel cell 2 and the traction motor 8.

The fuel cell 2 has a stack structure wherein multiple electric cells are laminated. As the fuel cell 2, there are various types, such as a phosphoric acid type and a solid oxide type, and a polymer electrolyte type is employed as the fuel cell 2 of this mode.

An oxidizing gas is fed under pressure to the air electrode (cathode) of the fuel cell 2 by an air compressor 5. An oxygen off-gas, for which the cell reaction at the fuel cell 2 has been performed, is delivered along an off-gas passage 16 and is employed for the exchange of water at a humidifier 17, and finally is discharged outside the system.

Hydrogen gas as a fuel gas is fed to the hydrogen electrode (anode) of the fuel cell 2 along a supply passage 23. The hydrogen gas is supplied to the fuel cell 2 from, for example, a hydrogen storage source 24, such as a high-pressure hydrogen tank, that is located upstream of the supply passage 23. It should be noted that hydrogen gas that is generated by reforming a material, such as alcohol or compressed natural gas, may be supplied to the fuel cell 2.

A hydrogen off-gas (fuel off-gas), for which the cell reaction of the fuel cell 2 has been performed, is discharged to an off-gas passage 25, returned to the supply passage 23 by a hydrogen pump 26, and again supplied to the fuel cell 2. An exhaust passage 27 is branched and connected to the off-gas passage 25. While the fuel cell system 1 is operated, a purging valve 28, which is located on the exhaust passage 27, is appropriately opened, and any impurity contained in the hydrogen off-gas is discharged, together with the hydrogen off-gas, downstream of the exhaust passage 27. Therefore, the density of an impurity that is contained in the hydrogen off-gas on the hydrogen circulation line can be reduced, and the hydrogen density of the hydrogen off-gas, which is circulated, can be increased.

A circulation pipe 11 for circulating a refrigerant is connected to the refrigerant inlet/outlet of the fuel cell 2. The refrigerant is supplied to the fuel cell 2 by a cooling pump 10 on the circulating pipe 11 to cool the fuel cell 2. A passage switching valve 12, which is located on the circulating pipe 11, may be used to bypass the refrigerant so that the refrigerant is not supplied to the fuel cell 2. That is, the passage switching valve 12 changes the path along which the refrigerant flows.

The accumulator device 3 (first accumulator device) is a secondary cell, for which charging and discharging is enabled, that serves as a high-voltage accumulator device. The accumulator device 3 is, for example, a nickel hydrogen cell or a lithium ion cell, and a capacitor other than a secondary cell may be employed.

The high-voltage DC/DC converter 4 is a direct-current voltage converter (first voltage converter). The high-voltage DC/DC converter 4 includes: a function for adjusting a direct-current voltage received from the accumulator device 3 and outputting the obtained voltage to the inverter 7 side; and a function for adjusting a direct-current voltage received from the fuel cell 2 or the traction motor 8, and outputting the obtained voltage to the accumulator device 3. The charging and the discharging of the accumulator device 3 are provided using these functions. Further, a voltage output by the fuel cell 2 is controlled by the high-voltage DC/DC converter 4.

Various types of auxiliary equipment associated with the operation of the fuel cell 2 are connected between the high-voltage DC/DC converter 4 and the fuel cell 2. The auxiliary equipment for this embodiment includes the one (first auxiliary equipment) used for use at a high voltage (e.g., a voltage higher than 12 V), and can be the air compressor 5, the cooling pump 10, the hydrogen pump 26, the purging valve 28 and the passage switching valve 12. An alternating current obtained through conversion by the inverters 6, 9 and 29 is supplied to the air compressor 5, the cooling pump 10 and the hydrogen pump 26. It should further be noted that the auxiliary equipment includes a pump for supplying a reforming material and a heater for adjusting the temperature of a reforming device.

During normal operation of the fuel cell 2, electric power for the auxiliary equipment (5, 10 and 26) is supplied by the fuel cell 2 without via the high-voltage DC/DC converter 4. On the other hand, during the process performed for halting the operation of the fuel cell 2, or at the initial operation time, electric power for the auxiliary equipment (5, 10 and 26) is supplied by the accumulator device 3 via the high-voltage DC/DC converter 4.

A low-voltage DC/DC converter 18 (second voltage converter) is connected between the accumulator device 3 and the high-voltage DC/DC converter 4. The low-voltage DC/DC converter 18 drops the voltage of part of the direct-current power for a high-voltage circuit side, and supplies this electric power to a low-voltage circuit side. Part of the resultant direct-current power is stored in a low-voltage battery (secondary cell) 19 that serves as a low-voltage accumulator device, and the remainder is employed as electric power for driving low-voltage auxiliary equipment 20. The low-voltage battery 19 (second accumulator device) serves as a source for supplying electric power to the low-voltage auxiliary equipment 20.

The low-voltage auxiliary equipment 20 includes various types of devices that are driven at a low voltage (e.g., 12 V), and that are different from the high-voltage auxiliary equipment (the air compressor 5, the cooling pump 10 and the hydrogen pump 26) of this embodiment, as described above. Various electric devices, such as a hydrogen tank valve, an injector for injecting hydrogen by adjusting injection pressure and an auxiliary equipment for the vehicle 100, correspond to the low-voltage auxiliary equipment 20. The auxiliary equipment for the vehicle 100 can, for example, be an air conditioner, a navigation system, lights, an injector device and blinkers (turn signal lamps) that are mounted on the vehicle 100. The low-voltage auxiliary equipment 20 can also be driven by electric power received from the low-voltage battery 19.

The control device 13 is provided as a microcomputer that includes a CPU, ROM and RAM. The control device 13 controls all the individual components (the high-voltage DC/DC converter 4, etc.) of the fuel cell system 1 and the individual components (the inverter 7, etc.) of the vehicle 100.

Specifically, the control device 13 controls the switching of the inverter 7 to output a three-phase alternating current consonant with a requested driving force to the traction motor 8. The control device 13 also controls the operation of the high-voltage DC/DC converter 4, so that electric power is supplied in consonance with a requested driving force. In addition, the control device 13 controls the supply of the oxidizing gas and hydrogen gas in consonance with a targeted electric power of the fuel cell 2, and controls the temperature of the fuel cell 2 using a cooling system. For example, the control device 13 permits the inverters 6, 29 and 9 to adjust the number of revolutions of motors (not shown) that drive the air compressor 5, the hydrogen pump 26 and the cooling pump 10, respectively. Furthermore, the control device 13 closes and opens various valves (the purging valve 28, etc.).

Figure 2:
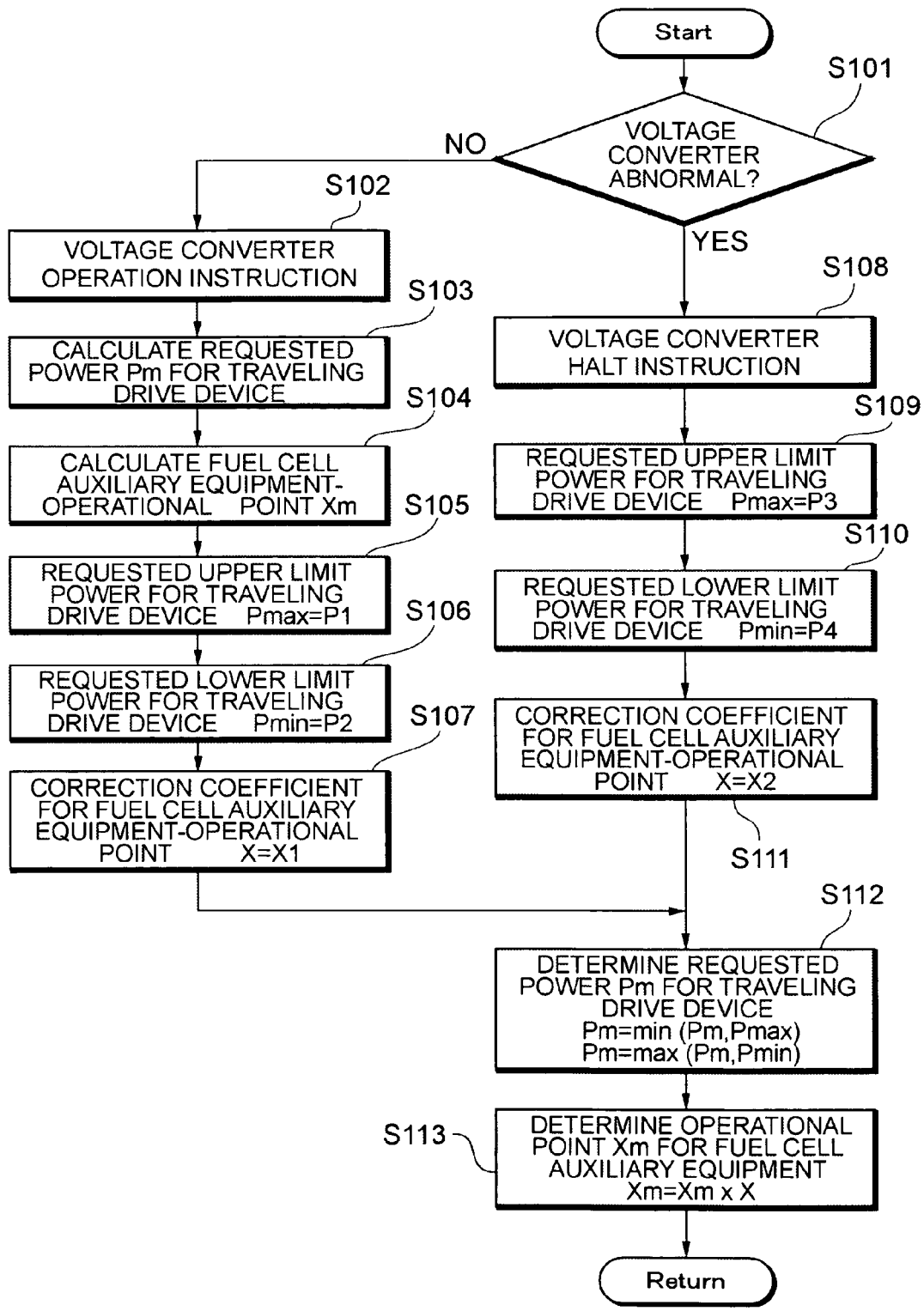
FIG. 2 is a flowchart illustrating the control processing performed by the fuel cell system in a normal situation and in an abnormal situation in a voltage converter.

FIG. 2 is a flowchart illustrating the control processing performed by the fuel cell system 1 in normal and abnormal situations in the high-voltage DC/DC converter 4.

This routine is read from the ROM of the control device 13 and performed by the CPU.

First, at step S101, the control device 13 judges whether operation of the voltage converter is abnormal, i.e., judges whether an abnormality has occurred in the high-voltage DC/DC converter 4. In a case wherein an abnormality has not occurred in the high-voltage DC/DC converter 4 (step S101; NO), the operation of the high-voltage DC/DC converter 4 is continued (step S102), and the control process is shifted to the succeeding step S103.

At step S103, electric power Pm, requested for the traction motor 8, is calculated. The requested electric power. Pm is the electric power to be supplied to the traction motor 103, and is obtained in the following manner. First, the control device 13 designates the targeted number of revolutions and the targeted torque for the traction motor 103. A product of these two is employed as the driving force to be output by the traction motor 8. When the value of this driving force is divided based on a ratio of a driving force that is output by the traction motor 103 relative to the operating efficiency and power consumption, the requested electric power Pm is obtained. When the traction motor 8 functions as a power generator to perform regenerative braking, the target torque is a negative value. In this case, the requested electric power Pm is a negative value.

Sequentially, at step S104, a fuel cell auxiliary equipment-operational point Xm is calculated based on the requested electric power Pm that is obtained. In this embodiment, the air compressor 5, the cooling pump 10, the hydrogen pump 26, the purging valve 28 and the passage switching valve 12 correspond to the fuel cell auxiliary equipment. When the fuel cell auxiliary equipment-operational point Xm is changed, the number of motor revolutions per unit time for the air compressor 5, the cooling pump 10 and the hydrogen pump 26, the ON/OFF count per unit time for the purging valve 28 and the count per unit time for switching the passage switching valve 12 are changed.

At the next step S105, a requested upper limit electric power Pmax for a traveling drive device is designated. For example, the requested upper limit electric power Pmax is designated to be a rated load power P1 for the traction motor 8. Here, since the requested upper limit electric power Pmax is the rated load power P1, this is a positive value.

Following this, at step S106, a requested lower limit electric power Pmin for the traveling drive device is designated. For example, the requested lower limit electric power Pmin is designated to be a rated electric power P2 generated by the traction motor 8. Here, the requested lower limit power P2 is a negative value because this is a case wherein the traction motor 8 functions as a power generator.

At the succeeding step S107, a correction coefficient X for the operational point of fuel cell auxiliary equipment is designated. As will be described later, the correction coefficient X is a value to be multiplied by the operational point Xm, designated above. Since this is a case wherein the high-voltage DC/DC converter 4 is operating normally, the correction coefficient X is X1, which is equal to 1.0. This is represented as follows.

$$X = X1 = 1.0$$

Thereafter, the requested upper limit electric power Pmax and the requested lower limit electric power Pmin are given to the requested electric power Pm, and requested electric power Pm is obtained (step S112). Then, the operational point Xm is corrected using the correction coefficient X (=X1), the final operational point Xm is determined (step S113), and the processing is advanced to "return".

On the other hand, in a case wherein an abnormality has occurred in the high-voltage DC/DC converter 4 (step S101; YES), the operation of the high-voltage DC/DC converter 4 is halted (step S108). In this case, the abnormality in the high-voltage DC/DC converter 4 may include, for example, a case wherein an overcurrent has flowed across a transistor thereof or a case wherein a temperature has increased. When the high-voltage DC/DC converter 4 is halted due to the abnormality, charging/discharging of the accumulator device 3 and controlling the amount of electric power generated by the fuel cell 2 are inhibited.

At this time, a case wherein the high-voltage DC/DC converter 4 is halted (step S108) is either the result of the control unit 13 outputting a control signal to the high-voltage DC/DC converter 4 to halt the operation, or the result of the high-voltage DC/DC converter 4 activating a self-protection circuit (stopping of the switching of the high-voltage DC/DC converter 4). In the second case, the control device 13 receives a signal indicating that the high-voltage DC/DC converter 4 is halted. At this time, the control device 13 may transmit an operation stop signal to the high-voltage DC/DC converter 4.

At the next step S109, the requested upper limit electric power Pmax for the travel drive device is designated to be P3. Here, the requested upper limit electric power P3 is designated for a value smaller than the rated load power P1. That is, P3<P1. For example, the upper limit electric power P3 is designated as follows.

$$P3 = P1 \times \frac{1}{3}$$

Since the upper limit value for the output of the traction motor 8 is controlled in this manner, upon the occurrence of an abnormality in the high-voltage DC/DC converter 4, the system 1 can be operated with an excess allowance.

At the next step S110, the requested lower limit electric power Pmin for a travel drive device is designated to be P4. Here, the requested lower limit electric power P4 is a designated value greater than the rated electric power P2 that is to be generated. That is, P4>P2. The requested lower limit electric power P4 is designated as P4=0, so that regeneration of the traction motor 8 is inhibited. When the lower limit value of the output of the traction motor 8 is controlled in this manner, upon the occurrence of an abnormality in the high-voltage DC/DC converter 4, the extra power state can be inhibited. It should be noted that when P4≠0, an electric power obtained by regeneration is consumed by the fuel cell auxiliary equipment.

At the next step S111, the correction coefficient X, for the operational point of fuel cell auxiliary equipment is designated to be X2. Here, the correction coefficient X2 is designated to be a value greater than the correction coefficient X1. That is, X2>X1. For example, the correction coefficient X2=1.5 is designated. The operational point X for the fuel cell auxiliary equipment should be changed, so that, in this manner, the power consumed by the fuel cell auxiliary equipment is greater than the power consumed at a normal time.

At the next step S112, the requested upper limit electric power Pmax (=P3) and the requested lower limit electric power Pmin (=P4) are given to the requested electric power Pm, and the requested electric power Pm is determined. While the output of the traction motor 8 is limited in this manner, the normal travel control is shifted to the limp-home control. As a result, the shortage of the supply of power by the fuel cell 2 is held back and the extra power state is also inhibited, and the driving of the traction motor 8 can be continued. That is, even in a case wherein an abnormality has occurred in the high-voltage DC/DC converter 4, halting of the operation of the vehicle 100 is not required, and travel of the vehicle 100 (in a limp home mode) can be continued.

At the next step S113, the operational point Xm is corrected using the correction coefficient X (=X2), and the final operational point Xm is determined. In this manner, the operational point Xm is corrected using the X2, which is greater than X1, so that, upon the occurrence of an abnormality in the high-voltage DC/DC converter 4, the efficiency of the fuel cell auxiliary equipment is lower than during the normal time. Because of this setup, the operation is performed in a state wherein the number of motor revolutions of the air compressor 5 is increased, and the air stoichiometric ratio is raised. Furthermore, in accordance with the above setup, the number of motor revolutions of the hydrogen pump 26 is increased. Since because of such setup extra oxidizing gas and hydrogen gas are supplied to the fuel cell 2, the fuel cell auxiliary equipment can be driven by electric power generated by the fuel cell 2, and the fuel cell system 1 can be operated with an excess allowance.

Further, when the operational point Xm is determined at step S113, the increase in the number of motor revolutions of the cooling pump 10 may be designated. Further, the ON/OFF count for the purging valve 28 and/or the count for the switching of the passage switching valve 12 may be increased. Especially in a case wherein the number of motor revolutions of the air compressor 5 is increased, a cross leakage amount of nitrogen (a gas impurity) that passes through an electrolyte film tends to be increased, and the density of the hydrogen contained in a hydrogen off-gas tends to be reduced. Therefore, it is useful to increase the ON/OFF count for the purging valve 28. It should be noted that the operational point of one of the fuel cell auxiliary equipment units (5, 26, 18, 28 and 12) may be changed, or all the operational points may be changed.

According to the fuel cell system 1 of the above described embodiment, and also in a case wherein the high-voltage DC/DC converter 4 is halted because of an abnormality, the traction motor 8 is shifted to the limp-home control mode. As a result, the vehicle 100 needs not be halted immediately after the abnormality has occurred, and the operating reliability of the vehicle 100 can be improved. Further, since the fuel cell auxiliary equipment is driven by power generated by the fuel cell 2, stable operation of the fuel cell 2 can be continuously performed, and the operation of the fuel cell system 1 can be appropriately continued.

It should be noted that, in a case wherein a vehicle equipment is connected between the fuel cell 2 and the high-voltage DC/DC converter 4, at steps S111 and S113, the operational points for the vehicle equipment may be changed. Here, the vehicle equipment corresponds to various power devices employed for the operation of the vehicle, and include a lighting device, an air conditioner and a hydraulic pump.

Furthermore, upon the occurrence of the abnormality in the high-voltage DC/DC converter 4, a notification to that effect may be transmitted to an occupant, such as the driver of the vehicle 100. For example, after an instruction for halting the voltage converter is issued at step S108, a notification that the traction motor 8 has been shifted to the limp-home control is transmitted to an occupant using sound, a display, etc.

INDUSTRIAL APPLICABILITY

The above described fuel cell system 1 can be mounted on not only two-wheel or four-wheel automotive vehicles, but also other mobile bodies such as trains, airplanes, ships, robots. Further, the fuel cell system 1 can also be employed as a stationary unit to be incorporated into a co-generation system.

The invention claimed is:

1. A fuel cell system, including: a fuel cell; and an accumulator device connected to a load, through a voltage converter, in parallel with the fuel cell, the fuel cell system comprising:
an auxiliary equipment which is electrically-connected to an electrical connection between the load and the fuel cell, wherein a first connecting point where the auxiliary equipment is connected to the electrical connection is located nearer to the fuel cell than a second connecting point where the voltage converter is connected to the electrical connection; and
a control device for controlling the voltage converter and the auxiliary equipment,
wherein, upon the occurrence of an abnormality in the voltage converter, the control device is programmed to change an operational point of the auxiliary equipment and the voltage converter is halted in response to an operation stop signal output by the control device.

2. The fuel cell system according to claim 1, wherein, upon the occurrence of an abnormality in the voltage converter, the control device changes the operational point of the auxiliary equipment after the voltage converter is halted.

3. The fuel cell system according to claim 1, wherein the auxiliary equipment is auxiliary equipment to be associated with the operation of the fuel cell; and
wherein, upon the occurrence of an abnormality in the voltage converter, the control device changes the operational point, so that the electric power consumed by the auxiliary equipment is greater than that normally consumed.

4. The fuel cell system according to claim 3, wherein the auxiliary equipment includes at least one of a compressor for feeding an oxidizing gas under pressure to the fuel cell, a pump for circulating a fuel gas to the fuel cell and a cooling pump for supplying a refrigerant to the fuel cell.

5. The fuel cell system according to claim 4, wherein, upon the occurrence of an abnormality in the voltage converter, the control device increases the number of revolutions of at least one of the compressor, the pump and the cooling pump.

6. The fuel cell system according to claim 3, wherein the auxiliary equipment includes at least either a purging valve for discharging fuel off-gas from the fuel cell or a passage switching valve for switching between refrigerant passages in order to cool the fuel cell.

7. The fuel cell system according to claim 6, wherein, upon the occurrence of an abnormality in the voltage converter, the control device increases at least either an ON/OFF count for the purging valve or a switching count for the passage switching valve.

8. The fuel cell system according to claim 1, wherein the auxiliary equipment is an auxiliary equipment for use at a high-voltage.

9. The fuel cell system according to claim 1, further comprising:
a second accumulator device connected, via a second voltage converter, to the voltage converter and in parallel with the accumulator device; and
a second auxiliary equipment which is electrically-connected to a second electrical connection between the second accumulator device and the second voltage converter, wherein a connecting point where the second auxiliary equipment is connected to the second electrical connection is located nearer to the second accumulator device than to the second voltage converter,
wherein the second accumulator device, the second voltage converter and the second auxiliary equipment are those used for a lower voltage than that for the accumulator device, the voltage converter and the auxiliary equipment.

10. A fuel cell system, including: a power generation unit to be driven by receiving electric power; a fuel cell for supplying electric power to the power generation unit; and an accumulator device connected to the power generation unit, through a voltage converter, in parallel with the fuel cell; the fuel cell system comprising:
a control device for controlling the voltage converter and the power generation unit,
wherein, upon the occurrence of an abnormality in the voltage converter, the control device is programmed to designate a lower limit value, for an output of the power generation unit, that is greater than a value of rated electric power generated by the power generation unit, and the voltage converter is halted in response to an operation stop signal output by the control device.

11. The fuel cell system according to claim 10, wherein, upon the occurrence of an abnormality in the voltage converter, the control device adjusts an upper limit value for the output of the power generation unit.

12. The fuel cell system according to claim 11, wherein the control device designates the upper limit value, for the output of the power generation unit, that is smaller than a rated load power for the power generation unit.

13. The fuel cell system according to claim 10, comprising:
an auxiliary equipment which is electrically-connected to an electrical connection between the load and the fuel cell, wherein a first connecting point where the auxiliary equipment is connected to the electrical connection is located nearer to the fuel cell than a second connecting point where the voltage converter is connected to the electrical connection.

14. The fuel cell system according to claim 13, wherein, upon the occurrence of an abnormality in the voltage converter, the control device changes an operational point of the auxiliary equipment.

15. A mobile body comprising a fuel cell system according to claim 1.

16. A mobile body comprising a fuel cell system according to claim 10.

17. The mobile body according to claim 16, wherein, upon the occurrence of an abnormality in the voltage converter, the control device permits the mobile body to travel in a limp home mode.

* * * * *